(12) United States Patent
Kuliha et al.

(10) Patent No.: US 7,195,311 B2
(45) Date of Patent: Mar. 27, 2007

(54) SAFETY DEVICE FOR VEHICLE SEATS

(75) Inventors: Norbert Kuliha, Hosbach (DE); Uwe Schmale, Huckeswagen (DE); Bernd Engels, Remscheid (DE)

(73) Assignee: Johnson Controls GmbH, Burscheid (DE)

( * ) Notice: Subject to any disclaimer, the term of this patent is extended or adjusted under 35 U.S.C. 154(b) by 117 days.

(21) Appl. No.: 10/522,963

(22) PCT Filed: Jul. 9, 2003

(86) PCT No.: PCT/EP03/07375

§ 371 (c)(1),
(2), (4) Date: Jan. 31, 2005

(87) PCT Pub. No.: WO2004/012958

PCT Pub. Date: Feb. 12, 2004

(65) Prior Publication Data

US 2006/0102821 A1    May 18, 2006

(30) Foreign Application Priority Data

Jul. 31, 2002  (DE) ............................... 102 35 086

(51) Int. Cl.
*B60N 2/42*     (2006.01)
*B60N 2/427*    (2006.01)

(52) U.S. Cl. ..................... 297/216.1; 297/216.15; 297/216.16; 297/470; 297/471; 297/472

(58) Field of Classification Search ............ 297/216.1, 297/215.15, 215.16, 470, 471, 472, 216.15, 297/216.16
See application file for complete search history.

(56) References Cited

U.S. PATENT DOCUMENTS 3,897,101 A * 7/1975 Hess .................... 297/216.1 X (Continued)

FOREIGN PATENT DOCUMENTS

DE        36 13 832 A1    10/1987

(Continued)

OTHER PUBLICATIONS

International Search Report (PCT), based on International Application No. PCT/EP03/07375, date of mailing of the International Search Report, Nov. 5, 2003 (2 double-sided pages).

(Continued)

*Primary Examiner*—Rodney B. White
(74) *Attorney, Agent, or Firm*—Foley & Lardner LLP (57) ABSTRACT

Safety device for a vehicle seat which is fixed inside a vehicle including lateral guides. The safety device consists of at least one safety rail fixed in the vehicle, in the region between the guides, and comprises associated securing mechanisms which are connected to the vehicle seat, and co-operate with the safety rail in a non-contact manner for regular loads applied to the seat, and in the event of irregular, especially accident-related deformations and/or movements in the region of the vehicle seat, engage with the safety rail in such a way that they block further deformation/displacements. The securing mechanisms and the safety rail are embodied in such a way that, during the engagement, reaction forces which act in the direction of axes (X, Y, Z) of a standard vehicle co-ordinates system are applied in a distributed manner to at least two different engagement regions of the safety rail.

11 Claims, 6 Drawing Sheets

U.S. PATENT DOCUMENTS

| | | | |
|---|---|---|---|
| 4,248,480 A * | 2/1981 | Koucky et al. | 297/216.1 X |
| 4,676,555 A * | 6/1987 | Tokugawa | 297/216.1 X |
| 4,676,556 A | 6/1987 | Yamanoi et al. | 297/216.1 |
| 4,729,602 A | 3/1988 | Tokugawa | |
| 4,784,434 A * | 11/1988 | Iwami | 297/216.1 |
| 4,804,229 A * | 2/1989 | Nishino | 297/471 |
| 4,824,175 A * | 4/1989 | Tokugawa | 297/471 X |
| 4,872,903 A * | 10/1989 | Periou | 297/472 X |
| 5,106,144 A * | 4/1992 | Hayakawa et al. | 297/216.1 X |
| 5,580,091 A * | 12/1996 | Doty | 297/472 X |
| 5,653,506 A * | 8/1997 | Wisner et al. | 297/216.1 X |
| 5,775,780 A | 7/1998 | Murphy et al. | |
| 5,924,773 A * | 7/1999 | Kirchhoff et al. | 297/471 X |
| 6,247,752 B1 * | 6/2001 | Bowers | 297/216.1 X |
| 6,352,312 B1 | 3/2002 | Rees | 297/216.1 X |
| 6,467,849 B1 * | 10/2002 | Deptolla | 297/216.1 X |
| 6,843,532 B2 * | 1/2005 | Borbe et al. | 297/216.1 X |
| 6,851,753 B2 * | 2/2005 | Akaike et al. | 297/216.1 X |
| 2002/0033625 A1 | 3/2002 | Goy et al. | |
| 2004/0090101 A1 * | 5/2004 | Andersson et al. | 297/216.15 X |

FOREIGN PATENT DOCUMENTS

| | | | | |
|---|---|---|---|---|
| DE | 3612474 A1 * | 1/1988 | | 297/216.1 |
| DE | 41 23 102 A1 | 1/1993 | | |
| DE | 36 14 457 C2 | 5/1996 | | |
| DE | 100 46 203 A1 | 6/2002 | | |
| EP | 0 900 689 A1 | 3/1999 | | |
| WO | WO 00/27667 | 5/2000 | | |

OTHER PUBLICATIONS

German Examination Report, based on German Application No. 102 35 086.8 (2 pages).

* cited by examiner

SAFETY DEVICE FOR VEHICLE SEATS

The present invention relates to a safety device for a vehicle seat secured within a vehicle via lateral guides, said device comprising at least one securing rail which is to be arranged in a positionally fixed manner in the floor region of the vehicle in the region between the guides and has associated securing means, which are connected or are to be connected to the vehicle seat and interact with the securing rail in such a manner that, in the case of regular seat loads, the securing means are arranged in a contactless manner relative to the securing rail and, by means of irregular, in particular accident-related deformations and/or movements in the region of the vehicle seat, come into engagement with the securing rail locking the vehicle seat against further deformations/movements.

A safety device of this type is described, for example, in WO 00/27667. This known device is provided for a multiple seat, i.e. a seat bench, which can be displaced over a region of adjustment via two lateral, parallel sliding guides within the vehicle and is guided in a manner such that it can be locked in different positions. In the event of severe decelerations and, in particular, in the case of accidents (head-on and rear impacts), the seat or the seat bench are subjected to large reaction forces which may be of such magnitude that without a safety device deformations of the entire seat bench or its supporting structure and, furthermore, also deformations in the region of the lateral guides and, in the worst case scenario, the entire seat arrangement could even be torn out. This is avoided by the safety device by the securing rail being arranged between the lateral seat sliding guides and parallel thereto, the securing means, which are designed as a securing slide, being arranged in a freely moveable manner longitudinally relative to the securing rail during regular displacement movements and in positions within the region of adjustment of the seat bench, but, by means of irregular deformations, which occur in the case of severe, for example accident-related decelerations or accelerations, in the region of the seat bench coming into engagement with the securing rail locking the seat bench. In the case of the known safety device, this engagement takes place in the region of lateral retaining webs with the securing rail, which is of approximately U-shaped design and is open upward, with, as the locking means, a plurality of cutouts distributed over the length of the rail being provided in the region of the retaining webs for engagement of at least one locking element of the securing slide. The supporting of the reaction forces therefore takes place here exclusively in the upper end region of the retaining webs of the securing rail. Thus, in the case of the known embodiment, the securing rail has to be very robust and consequently of a large size in order to be able to support the forces, which occur in a concentrated manner at one point.

The present invention is based on the object of improving a safety device of the type mentioned in such a manner that the components can be significantly lighter and smaller in size while an effective securing function is maintained.

According to the invention, this is achieved by the securing means and the securing rail being designed in such a manner that, during the engagement, deceleration-related reaction forces, which act in the direction of axes of a conventional vehicle coordinate system, are absorbed in at least two different engagement regions of the securing rail. A distribution of the reaction forces to different engagement regions is therefore achieved according to the invention. This concept is based on the finding that up to approximately 40% of the reaction forces occurring in most cases act in the direction of a horizontal vehicle longitudinal axis (X-axis of the conventional vehicle coordinate system) and up to approximately 60% of them act in the direction of a vertical axis (Z-axis) and possibly in the direction of a horizontal transverse axis (Y-axis). The securing means therefore have, in one advantageous refinement of the invention, a first engagement part for absorbing forces primarily in the direction of the vertical axis (Z) and, if appropriate, also in the direction of the transverse axis (Y), and a separate, second engagement part for absorbing forces primarily acting in the direction of the longitudinal axis (X). In this connection, provision is made, in a particularly advantageous refinement, for the second engagement part to be movable relative to the first engagement part in such a manner that, by a certain actuating force being applied to it, it can be moved from a non-engagement position into an engagement position also independently of the first engagement part and, in particular, already before the latter in time. This results in the further advantage of being able to use a seatbelt tensile force as actuating force by the second engagement part being connected, for actuation purposes, to a seatbelt securing means (in particular to a belt buckle in the seat region). A control activated by the belt force thereby enables the forces acting in the direction of the longitudinal axis to be supported even before deformations occur in the region of the seat structure that then give rise to forces acting, in particular, in the direction of the vertical axis.

The force distribution according to the invention in particular enables the securing rail to be significantly lighter and of a smaller size. In one embodiment, in which the securing rail has a U- or horizontally C-shaped cross section open upward in the direction of the seat for the engagement of the securing means and with a base and two retaining limbs bounding a longitudinal opening, the invention provides locking means in the region of the base, in particular in the form of a plurality of toothing-like cutouts distributed in the longitudinal direction of the rail, for engagement of a pawl-like locking section of the second engagement part. Analogously to the prior art, the first engagement part uses supporting sections to engage behind the retaining limbs of the securing rail, but, because of the invention, forces are only absorbed here in the direction of the vertical axis and, if appropriate, in the direction of the transverse axis.

Further advantageous refinement features of the invention are contained in the subclaims and in the following description.

The invention is to be explained in more precise detail with reference to preferred exemplary embodiments which are illustrated in the drawing, in which.

In the various figures of the drawing, parts and components which are identical or correspond functionally are always provided with the same reference numbers, and so they generally also only need to be described once in each case.

In the figures of the drawing, of a vehicle seat which is to be secured by a safety device 1 according to the invention, which seat may also be designed as a multiple seat or seat bench, only a supporting seat structure or a seat frame 2 together with one of a number of crossmembers 4 and one of a number of longitudinal members 6 is indicated. The vehicle seat or its seat frame 2 can be displaced over a certain region of adjustment in the longitudinal direction of the vehicle (X-axis of a conventional vehicle coordinate system) via two lateral sliding guides (not illustrated) parallel to each other within a vehicle and, in this connection, can be guided in a manner such that it can be locked in different positions.

The safety device 1 comprises essentially (at least) one securing rail 8 which is to be arranged in the floor region of the vehicle in a positionally fixed manner in the region between the seat guides and parallel to the direction of displacement of the seat and has associated securing means 10, which are connected or are to be connected to the vehicle seat or the seat frame 2 and interact with the securing rail 8 in such a manner that, in the case of regular seat loads, the securing means 10 are arranged contactlessly relative to the securing rail 8 and, as a result, in a freely movable manner longitudinally within the adjustment region of the seat but, by means of irregular, in particular accident-related deformation and/or movements in the region of the vehicle seat or of the seat frame 2, come into engagement with the securing rail 8 locking the seat against further deformations and/or movements.

According to the invention, the securing means 10 and the securing rail 8 are designed in such a manner that, during the engagement of the securing means 10, reaction forces produced via the seat are absorbed in at least two different engagement regions of the securing rail 8.

In the exemplary embodiments illustrated, the securing rail 8 has an approximately U- or horizontally C-shaped cross section which is open upward in the direction of the seat for engagement of the securing means 10 with a base 12 and two retaining limbs 16 bounding a slot-shaped longitudinal opening 14. The retaining limbs 16 are expediently bent over inward through approximately 180° in the upper, free end region so as to form supporting edges 18.

Figure 1:
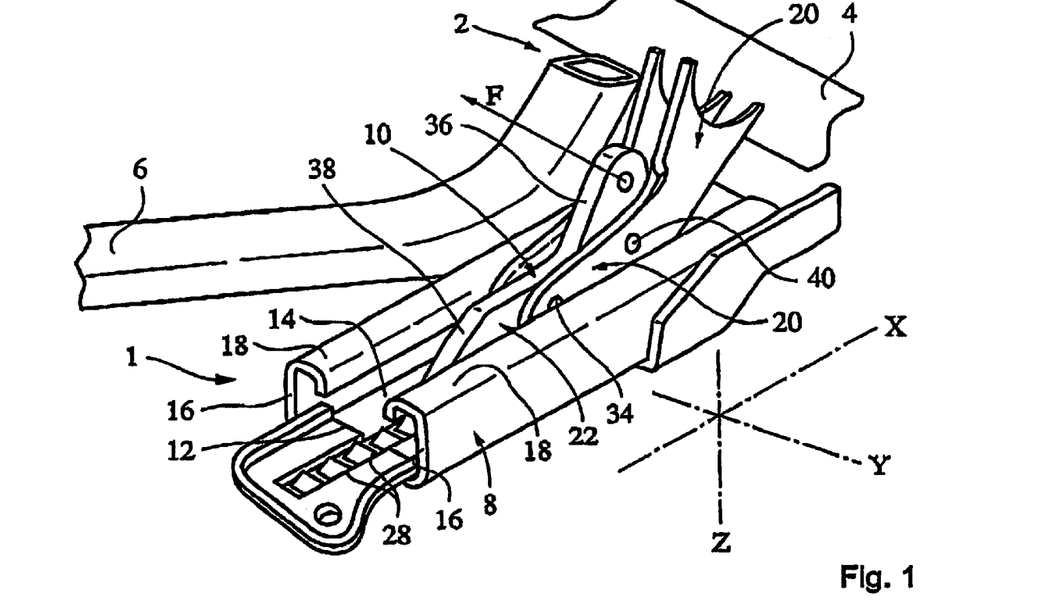
FIG. 1 shows a first embodiment of a safety device according to the invention in a perspective view obliquely from the front and top.
Figure 2:
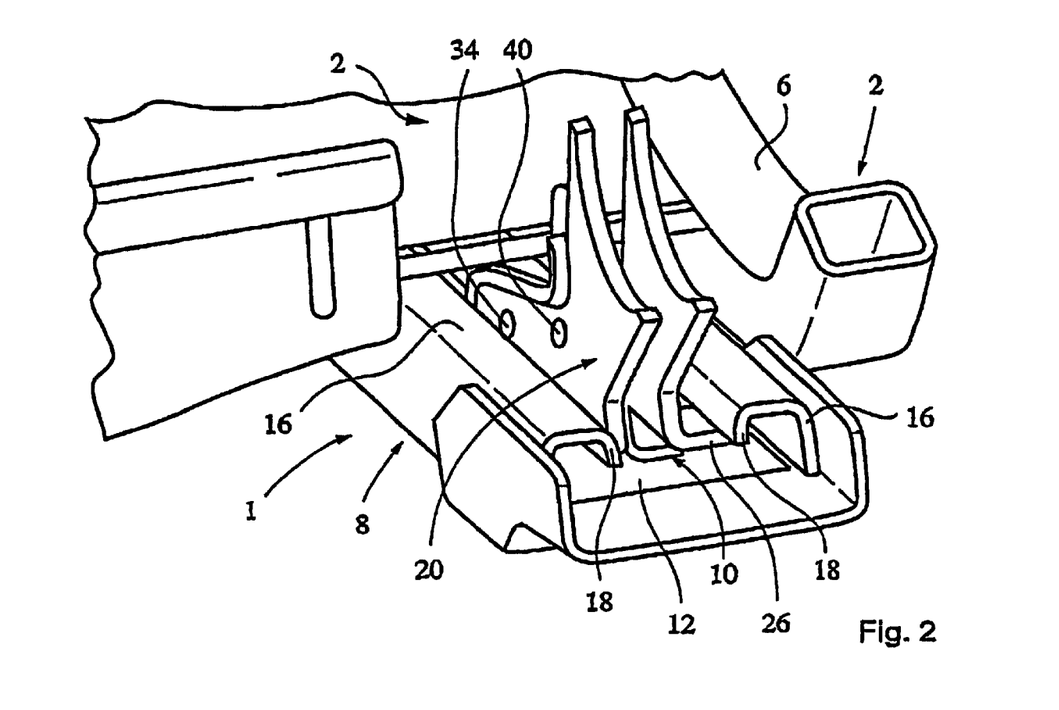
FIG. 2 shows a perspective view obliquely from the rear.
Figure 3:
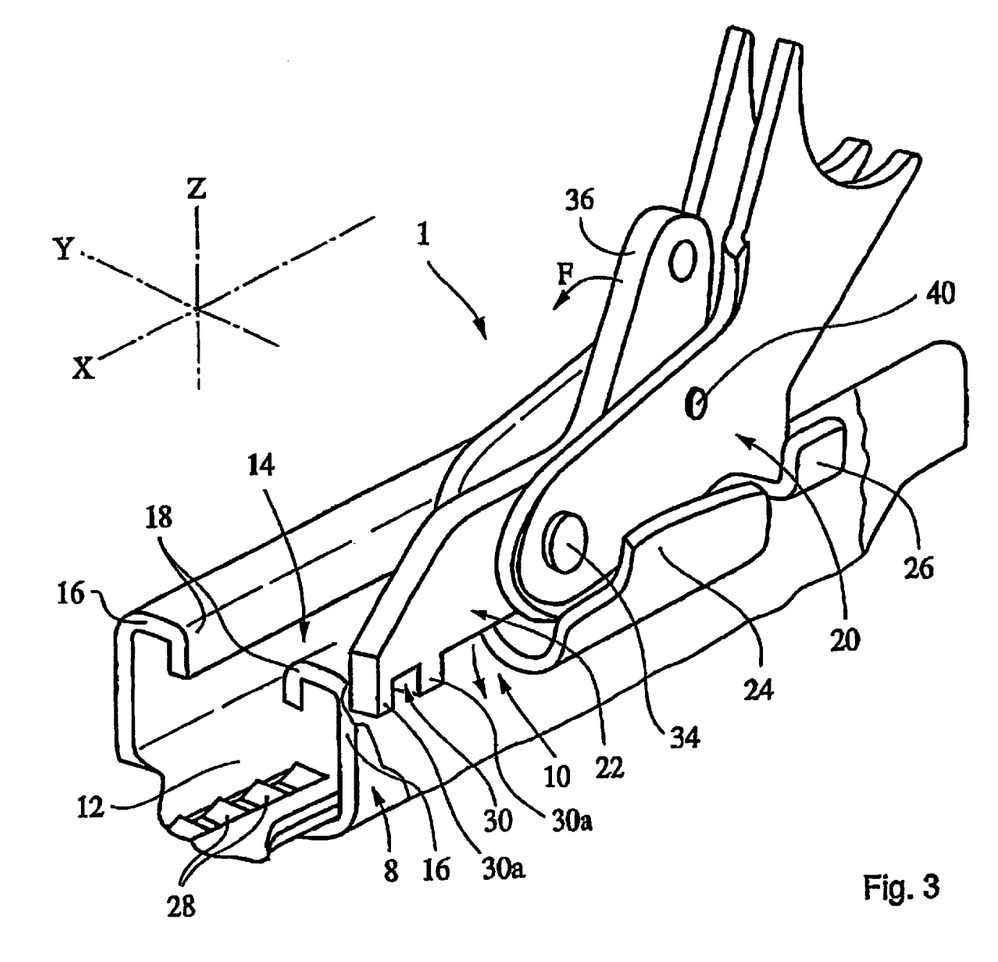
FIG. 3 shows a further perspective view partially broken open to show the securing means.
Figure 4:
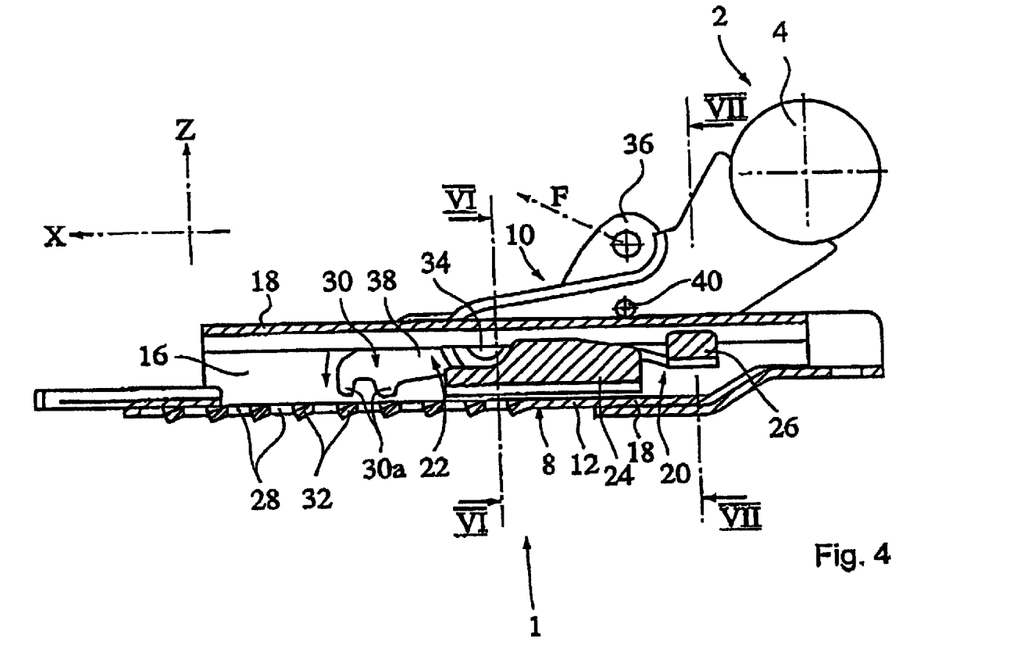
FIG. 4 shows a longitudinal section through the safety device in the starting position (non-engagement position)
Figure 5:
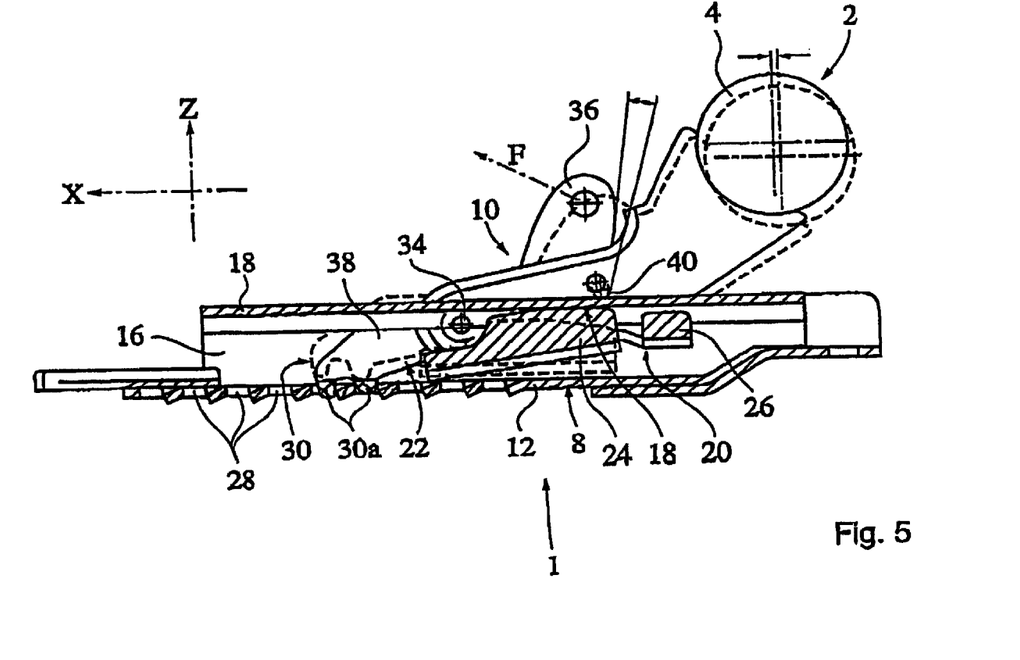
FIG. 5 shows a view as in FIG. 4, but in the engagement position.
Figure 6:
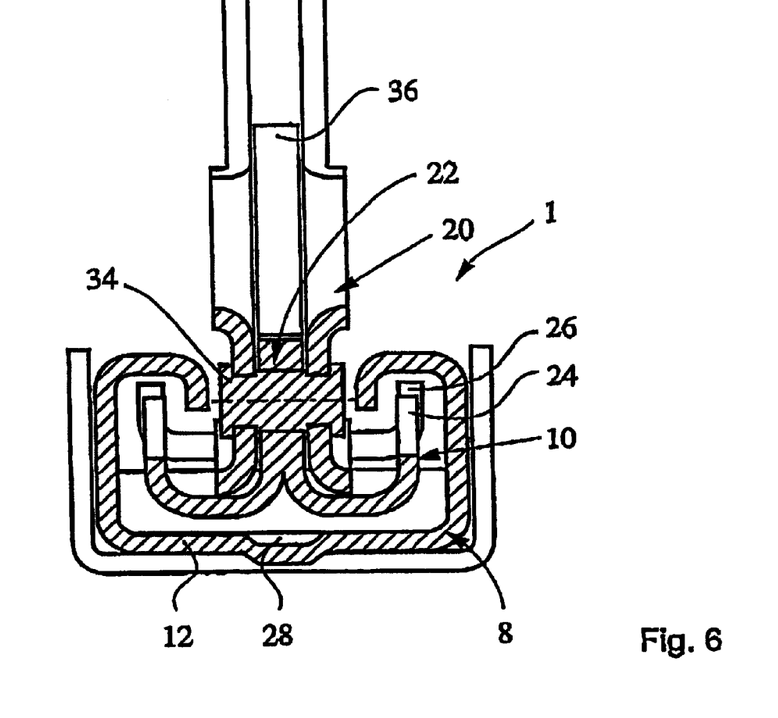
FIG. 6 shows an enlarged cross section in the plane VI—VI according to FIG. 4.
Figure 7:
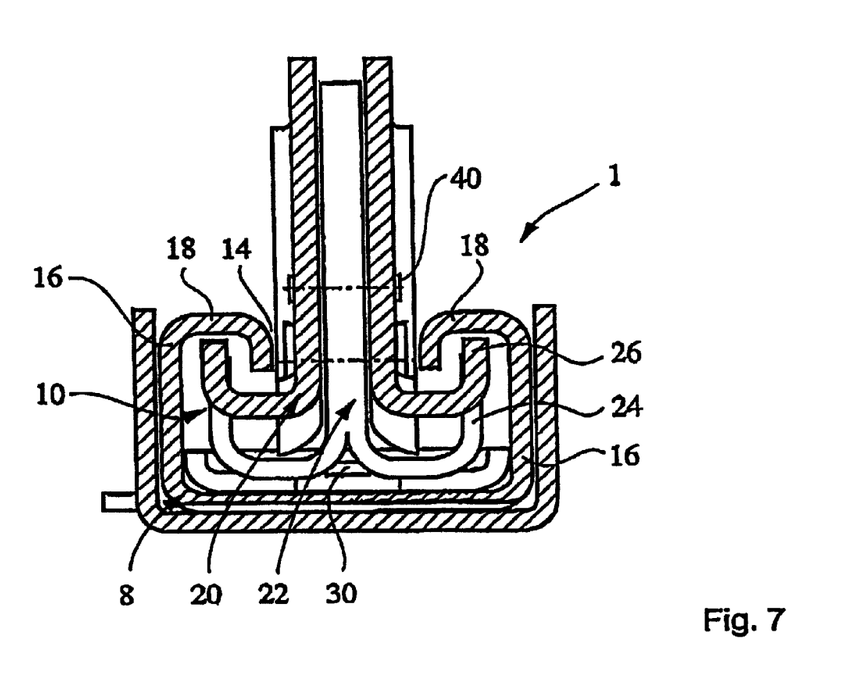
FIG. 7 shows a cross section in the plane VII—VII according to FIG. 4.
Figure 8:
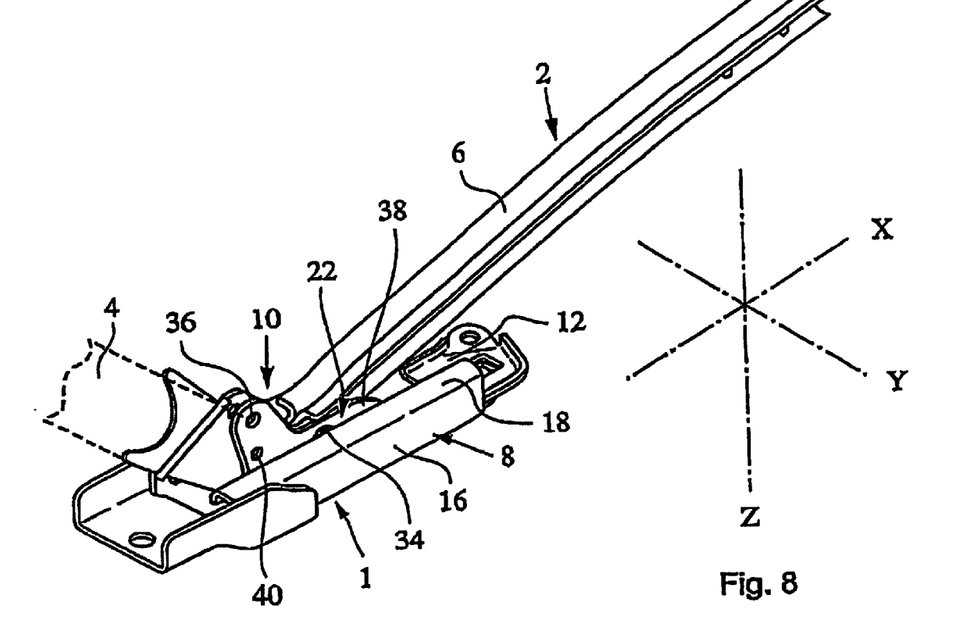
FIG. 8 shows a second embodiment of the safety device according to the invention in a perspective view obliquely from the rear.

In this embodiment, reaction forces, which act in the direction of a horizontal longitudinal axis X of a conventional vehicle coordinate system, which is shown in FIGS. 1, 3 and 8 and also partially in FIGS. 4 and 5, are preferably absorbed in an engagement region formed by the base 12. A further engagement region is formed by the retaining limbs or the supporting edges 18, to be precise primarily for reaction forces which act in the direction of a vertical axis Z and, if appropriate, also in the direction of a horizontal transverse axis Y.

For this purpose, the securing means 10 have a first engagement part 20 for absorbing the forces primarily in the Z- and Y-direction and furthermore a separate, second engagement part 22 for absorbing the force primarily in the direction of longitudinal axis X. The first engagement part 20 is connected rigidly to the seat frame 2 in such a manner that only deformations or movements occurring in the region of the seat frame 2 cause it to come into an engagement position in the region of the supporting edges 18 of the retaining limbs 16 of the securing rail 8. By contrast, the second engagement part 22 can be moved, according to the invention, relative to the first engagement part 20 in such a manner that, by a certain actuating force F being applied to it, it can be moved from a non-engagement position into an engagement position in the region of the base 12 of the securing rail 8 also independently of the first engagement part 20, i.e. in particular, also already before the latter in time.

In one particularly advantageous refinement of the invention, the second engagement part 22 is connected to a seatbelt securing means (not illustrated) in such a manner that a belt tensile force acts on the second engagement part 22 as actuating force F. The effect advantageously achieved as a result is that the engagement for the purpose of supporting the reaction forces primarily acting in the X-direction is activated by the belt tensile force ("securing activated by belt force").

In this connection, it is furthermore advantageous if, in its engagement position, the second engagement part 22 additionally also uses supporting sections 24 to absorb forces in the direction of the vertical axis Z and, if appropriate, in the direction of the transverse axis Y, but with the supporting sections 24 coming into engagement in the region of the supporting edges 18 of the retaining limbs 16 of the securing rail 8.

The first engagement part 20 likewise uses supporting sections 26 to engage behind the retaining limbs 16 or the supporting edges 18 thereof to support the forces in the Z/Y direction.

The securing rail 8 has locking means in the region of the base 12, in particular in the form of a plurality of toothing-like cutouts 28 distributed in the longitudinal direction of the rail, for form-fitting engagement of a pawl-like locking section 30 of the second engagement part 22. The forces acting in the X-direction are therefore supported via the webs 32 formed in each case between the cutouts 28. The locking section 30 can have—as illustrated—(at least) two engagement lugs 30a for the simultaneous engagement, in a form-fitting manner in the X-direction, in two cutouts 28.

In the preferred exemplary embodiments illustrated, the second engagement part 22 is designed as a double lever mounted pivotably about a transverse axis by means of a hinge bolt 34. In this case, a first lever section 36 can have the actuating force F applied to it, and a second lever section 38 has the locking section 30 for engagement in the region of the base 12 of the securing rail 8. The first lever section 36 also has the supporting sections 24 for engaging behind the retaining limbs 16 of the securing rail 8 (see, for example, FIG. 3). The second engagement part 22 is expediently locked in its non-engagement position in such a manner that an unlocking for transferring it into the engagement position is possible only by means of an actuating force F exceeding a certain minimum value. This advantageously avoids even relatively small belt forces, for example breaking-related forces, being able to lead to unlocking and engagement occurring. The second engagement part 22 is preferably locked in the non-engagement position by a predetermined breaking point, in particular in the form of an interchangeable shearing pin 40. This predetermined breaking point or the shearing pin 40 is configured in such a manner that breaking occurs only above a certain value of the actuating force F.

Some differences in the two embodiments illustrated, on the one hand, in FIGS. 1 to 7 and, on the other hand, in FIGS. 8 to 10 will be explained below.

According to FIGS. 1 to 7, the first engagement part 20 is fastened, in particular welded, to a rear frame transverse member 4 in such a manner that it protrudes freely from the transverse member into the region of the securing rail 8. In this case, the first engagement part 20 expediently comprises two flat parts which are parallel to each other and between them form a mount for the pivoting mounting of the second, lever-shaped engagement part 22. In this respect, the hinge bolt 34 extends through aligned openings of the two engagement parts. The same is also true for the shearing pin 40. As emerges in this connection in particular from FIGS. 3 to 5, the supporting sections 24 and 26 of the two engagement parts 20, 22, which sections are provided for engaging behind the supporting edges 18 of the retaining limbs 16 of the securing rail 8, are expediently offset with respect to each other in the longitudinal direction of the securing rail 8. This results in the advantage of a very low overall height for the securing rail 8.

Figure 9:
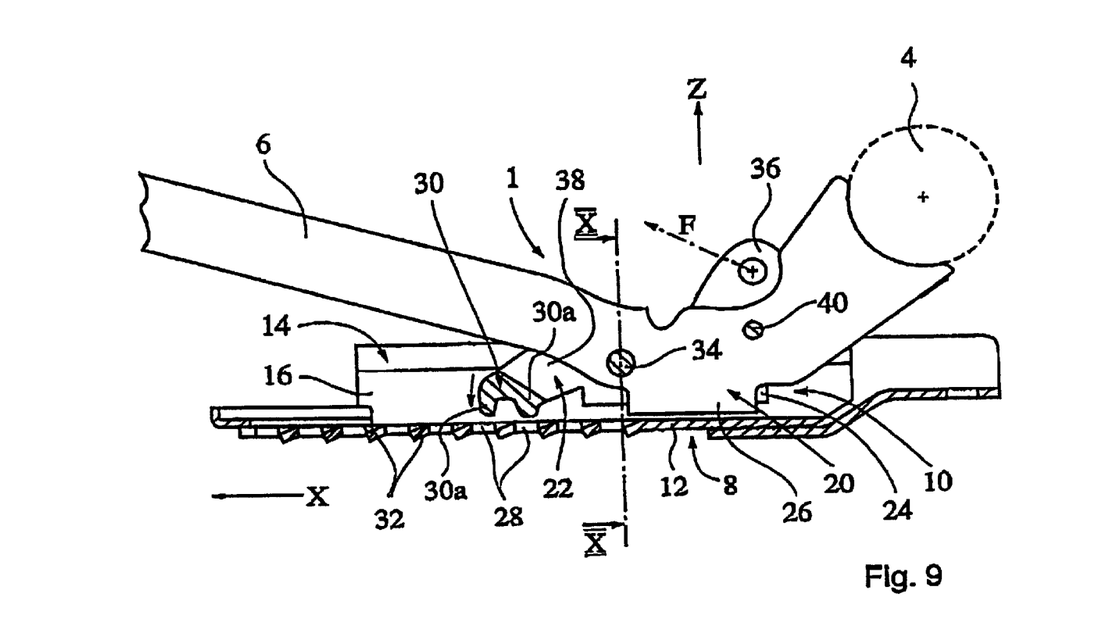
FIG. 9 shows a longitudinal section through the embodiment according to FIG. 8 (section plane IX—IX in FIG. 10)
Figure 10:
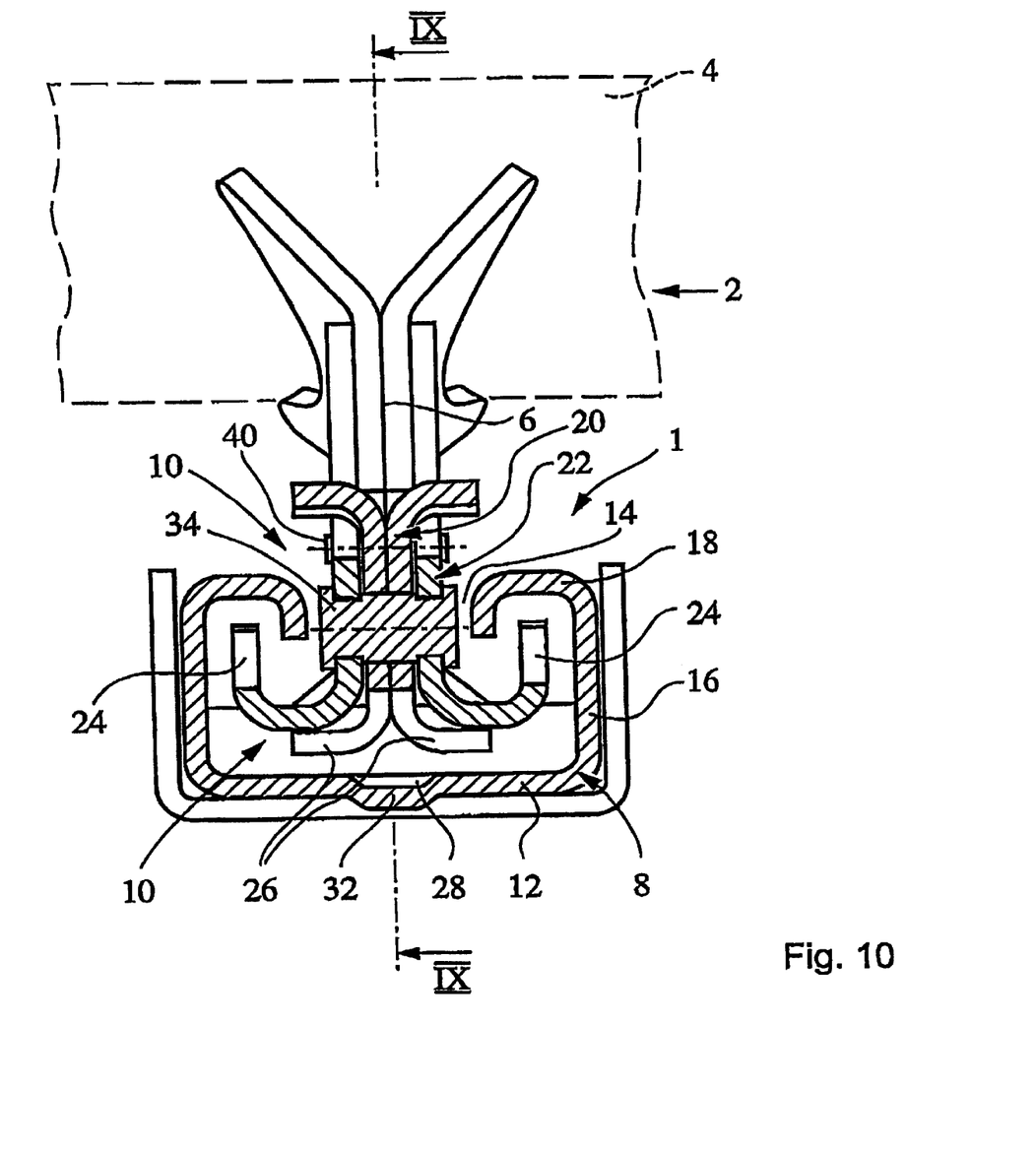
FIG. 10 shows an enlarged cross section in the plane X—X according to FIG. 9.

As far as the variant embodiment according to FIGS. 8 to 10 is concerned, the first engagement part 20 is formed here as an integral part of a frame longitudinal member 8. In this connection, the second engagement part 22 comprises two flat parts which are arranged on both sides of the longitudinal member 6. The two flat parts of the second engagement part 22 therefore accommodate the first engagement part 20 between them. In this case too, the hinge bolt 34 and the shearing pin 40 extend in each case through aligned openings of the two engagement parts 20, 22. According to the cross section in FIG. 10, in this case the supporting sections 24, 26 of the two engagement parts 20, 22 are arranged together in a region of the longitudinal extent of the securing rail 8. The supporting sections 26 of the first engagement part 20 preferably engage behind the retaining limbs 16 indirectly by engaging under the supporting sections 24 of the second engagement part 22. However, this leads to a somewhat larger overall height for the arrangement.

The invention is not confined to the exemplary embodiments illustrated and described, but also encompasses all embodiments of equivalent effect within the meaning of the invention. Furthermore, the invention is also not yet confined to the combination of features defined in claim 1 but may also be defined by any other desired combination of particular features of all disclosed individual features. This means that, in principle, virtually any individual feature of claim 1 can be omitted or replaced by at least one individual feature disclosed elsewhere in the application. To this extent, claim 1 is to be understood merely as a first attempt at formulating an invention.

The invention claimed is:

1. A safety device (1) for a vehicle seat, the vehicle seat coupled to a vehicle and including at least two spaced apart lateral guides, the safety device comprising:
    a securing mechanism (10) including a first engagement part (20) and a separate second engagement part (22), with the second engagement part (22) locked with a shear pin having a predetermined breaking point; and
    a securing rail (8) fixedly disposed between the lateral guides and coupled to the securing mechanism (10) and the vehicle seat,
    wherein the securing mechanism (10) is configured to engage the securing rail (8) upon the vehicle seat deforming a predetermined distance, and wherein reaction forces in the direction of axes (x,y,z) of the vehicle seat caused by such engagement are absorbed by at least two different engagement regions of the securing rail (8) by the first engagement part (20) and the second engagement part (22) in a sequence such that the second engagement part (22) contacts the securing rail (8) independently and before the first engagement part (20) engages the securing rail (8).

2. The safety device as claimed in claim 1, wherein the first engagement part (20) is connected rigidly to a seat frame (2) in such a manner that deformations or movements occurring in the region of the seat frame (2) cause it to come into an engagement position with the securing rail (8).

3. The safety device as claimed in claim 1, wherein the second engagement part (22) is connected to a seatbelt securing device in such a manner that a belt tensile force acts on the second engagement part (22) as actuating force (F).

4. The safety device as claimed in claim 3, wherein the second engagement part (22) is designed as a double lever mounted pivotably about a transverse axis, a first lever section (36) having the actuating force (F) applied to it, and a second lever section (38) serving for engagement in the securing rail (8).

5. The safety device as claimed in claim 1, wherein the securing rail (8) has an approximately U-shaped cross section which is open upward in the direction of the seat for the engagement of the securing mechanisms (10) with a base (12) and two retaining limbs (16) bounding a longitudinal opening (14).

6. The safety device as claimed in claim 5, wherein the first engagement part (20) of the securing mechanisms (10) uses supporting sections (26) to engage behind the retaining limbs (16) of the securing rail (8).

7. The safety device as claimed in claim 5, wherein the securing rail (8) includes a plurality of toothed cutouts (28) distributed in the longitudinal direction of the rail in the region of the base (12), for engagement of a locking section (30) of the second engagement part (22).

8. The safety device as claimed in claim 1, wherein the first engagement part (20) is an integral part of a frame longitudinal member (6) of the vehicle seat.

9. The safety device as claimed in claim 1, wherein the first engagement part (20) is fastened to a frame transverse member (4) of the vehicle seat and protrudes freely from the transverse member (4) into the region of the securing rail (8).

10. A safety device (1) for a vehicle seat, the vehicle seat coupled to a vehicle and including at least two spaced apart lateral guides, the safety device comprising:
    a securing mechanism (10) including a first engagement part (20) and a separate second engagement part (22) with the second engagement part (22) locked with a shear pin having a predetermined breaking point, both parts (20, 22) comprising a supporting section (24,26); and
    a securing rail (8) fixedly disposed between the lateral guides and coupled to the securing mechanism (10) and the vehicle seat, the securing rail (8) including opposite facing retaining limbs (16) in the longitudinal direction,
    wherein the securing mechanism (10) is configured to engage the securing rail (8) behind the longitudinal offset retaining limbs (16) of the securing rail (8) upon the vehicle seat deforming a predetermined distance, and wherein reaction forces in the direction of axes (x,y,z) of the vehicle seat caused by such engagement are absorbed by at least two different engagement regions of the securing rail (8) by the first engagement part (20) and the second engagement part (22).

11. The safety device as claimed in claim 10, wherein the supporting sections (24, 26) of the first and second engagement parts (20, 22), which sections are provided for engaging behind the retaining limbs (16) of the securing rail (8), are arranged together in a region of the longitudinal extent of the securing rail (8), the supporting sections (26) of the first engagement part (20) engaging behind the retaining limbs (16) of the securing rail (8) indirectly via the supporting sections (24) of the second engagement part (22).

* * * * *